M. I. GOLDSMITH.
CORN THINNER.
APPLICATION FILED JAN. 10, 1918.
1,343,558.
Patented June 15, 1920.
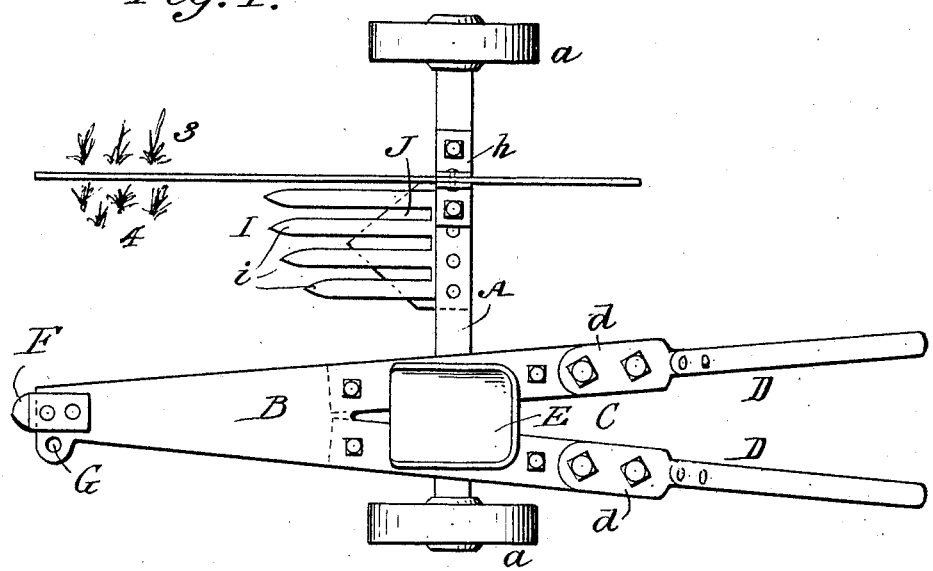
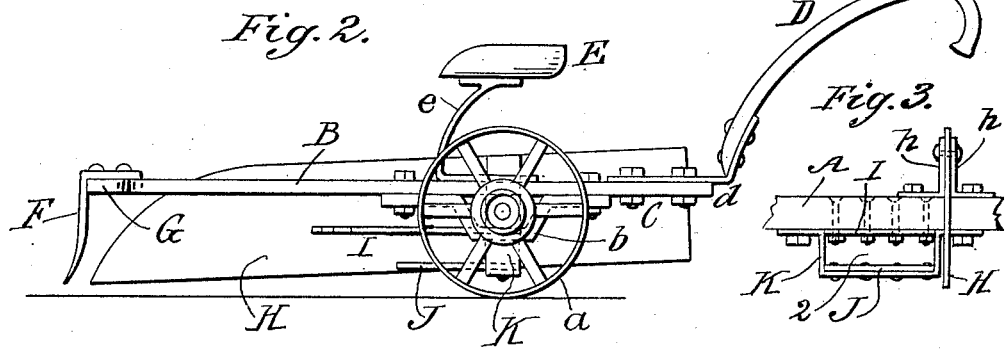
INVENTOR
M. I. Goldsmith
BY
*[signature]*
ATTORNEY

UNITED STATES PATENT OFFICE.

MARY ISHAM GOLDSMITH, OF THE PLAINS, VIRGINIA.

CORN-THINNER.

1,343,558.

Specification of Letters Patent.   Patented June 15, 1920.

Application filed January 10, 1918. Serial No. 211,262.

*To all whom it may concern:*

Be it known that I, MARY ISHAM GOLDSMITH, a citizen of the United States, and resident of The Plains, in the county of Fauquier and State of Virginia, have invented certain new and useful Improvements in Corn-Thinners, of which the following is a specification.

This invention relates to corn thinners; and has for its object to provide an agricultural implement adapted for effectually and economically uprooting and segregating excess plants from a row during the early processes of their growth, whereby the remaining or required number of plants may be allowed to absorb the maximum of nutriment from their surrounding soil and perfectly straight and uniform rows may be maintained.

The implement comprises an elongated upright guide-plate for separating the excess plants from those that are required for mature growth, fork-means and a horizontal plate for uprooting and discarding them, and a vehicle, or carrier, all as hereinafter fully described, and specifically set forth in the annexed claims.

In the accompanying drawings, forming part of this specification, Figure 1 is a plan view of my improved implement. Fig. 2 is a side view; and Fig. 3 is a fragmentary rear end view.

In the drawings which illustrate one form of my improved implement A, indicates an axle which is square in cross section and has journaled on each end a traction wheel $a$.

Secured near one end of the axle A, by means of suitable straps, or hangers $b$, is a beam B, having a rearwardly located bifurcated extension C. On each arm of said extension is mounted a handle D, by means of metal straps $d$. These handles are detachable, whereby an operator may remove them when he desires to drive the device from the seat E, which is also mounted on the beam A, by means of the resilient metal support $e$. At the forward end of the beam A, is a harrow-blade F, and also a laterally extended eye G, to which a clevis or the whiffletree-hook of a horse's harness may be attached for the purpose of drawing the device over the ground.

Near the end of the axle A, farthest from the beam B, is forwardly extended elongated blade H, composed of thin sheet steel, and which is in upright position and secured to said axle by means of the metal straps $h$; said blade extending at a slight angle downwardly to a point adjacent to the surface of the ground over which the device is adapted to be drawn and acting as a guide and means for separating the immature plants, as will be hereinafter described.

Located on and fastened beneath the axle A, closely adjacent to the lower edge of the blade H, is a fork I, comprising a plurality of sharp-pointed thin sheet steel tines $i$, which are graduated in length, decreasing inwardly. This fork is adapted for uprooting the excess plants; and they are received upon a beveled-edge plate or table J, mounted on a depending approximately U-shaped hanger K, which is bolted to the under surface of the axle A, whereby a passage-way, or open space 2, is provided for discharging the uprooted plants rearwardly, as clearly illustrated in Fig. 3 of the drawings.

In the operation and use of the invention, the device is driven over a row of young plants to be thinned out, the blade H, located and guided so as to pass between the plants that are required to remain in the row, as 3, Fig. 1 of the drawings, and the plants, as 4, which are required to be uprooted. Said plants 4, being uprooted by the fork I, as the implement is drawn along over the row, received on the table J, and discharged rearwardly through the opening, or passage-way 2; the blade F, acting simultaneously to harrow the soil.

The implement may be guided and operated by means of the handles D; or when said handles are detached an operator, or driver, may guide the device from the seat E.

I do not confine myself to the specific details of mere mechanical construction as herein shown and described, as, under the spirit and scope of my invention, I believe I am entitled to the use of slight variations of construction that by practice may be found desirable.

Having thus described my invention, what I claim as new, and desire to secure by Letters Patent is:

1. An agricultural implement for thinning corn, comprising a longitudinally extended guide-blade for separating the plants, a fork at right angles with said blade and laterally adjacent thereto and having a plurality of tines of differential lengths, said fork for uprooting excess plants, and a receiving plate located beneath said fork, and vehicle means supporting said parts whereby they may be moved over a corn field.

2. A corn thinner comprising a guide-blade, a fork having a plurality of tines of differential lengths, and a receiving plate beneath said fork, and supporting means therefor comprising a vehicle embodying an axle and traction wheels, substantially as shown and described.

3. In an agricultural implement for thinning corn, the combination of a vehicle embodying an axle, traction-wheels and a beam having a seat and removable handles; with a guide blade, and a fork having a plurality of tines, and a beveled-edge table, said table located beneath said fork, whereby uprooted plants may be discharged thereover and beneath said axle, substantially as shown and described.

In testimony that, I claim the foregoing as my invention, I have signed my name in presence of two witnesses, this 4th day of December, 1917.

MARY ISHAM GOLDSMITH.

Witnesses:
  EMMA JANE LEACHE,
  A. O. WEEDON.